US 8,960,362 B2

(12) United States Patent
Barbir

(10) Patent No.: US 8,960,362 B2
(45) Date of Patent: Feb. 24, 2015

(54) LUBRICATION ARRANGEMENT FOR A DRIVE AXLE OF A HAUL VEHICLE

(71) Applicant: Caterpillar Inc., Peoria, IL (US)

(72) Inventor: Mirko Barbir, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 18 days.

(21) Appl. No.: 13/930,364

(22) Filed: Jun. 28, 2013

(65) Prior Publication Data

US 2015/0000990 A1   Jan. 1, 2015

(51) Int. Cl.
*F16H 57/04*    (2010.01)
*F16N 7/18*    (2006.01)
*B62D 61/10*    (2006.01)

(52) U.S. Cl.
CPC .............. *F16H 57/042* (2013.01); *B62D 61/10* (2013.01); *F16N 7/18* (2013.01); *F16H 57/0424* (2013.01); *F16H 57/0483* (2013.01)
USPC ............. 180/378; 74/467; 475/160; 184/6.12

(58) Field of Classification Search
CPC ............ F16H 57/0483; F16H 57/0424; F16H 57/0457; F16H 57/0423; F16H 57/04; F16C 33/6659; F16N 7/18; F16N 7/26
USPC ................... 475/160; 74/467; 184/6.12, 11.2; 180/378, 24.09, 24.08, 248
See application file for complete search history.

(56) References Cited

U.S. PATENT DOCUMENTS

| | | | | |
|---|---|---|---|---|
| 2,240,118 A | * | 4/1941 | Matthews | 184/11.1 |
| 3,529,698 A | * | 9/1970 | Nelson | 184/6.12 |
| 4,217,794 A | | 8/1980 | Sanui et al. | |
| 4,824,264 A | | 4/1989 | Hoebel | |
| 4,841,797 A | * | 6/1989 | Cerrington et al. | 74/467 |
| 5,232,291 A | * | 8/1993 | Kuan | 384/473 |
| 5,989,143 A | * | 11/1999 | Bell et al. | 475/160 |
| 7,258,641 B2 | | 8/2007 | Green et al. | |
| 7,645,074 B2 | * | 1/2010 | Chiba et al. | 384/571 |
| 8,267,223 B2 | * | 9/2012 | Ideshio et al. | 184/6 |
| 8,366,575 B2 | * | 2/2013 | Ariga et al. | 474/91 |
| 8,366,577 B2 | * | 2/2013 | Shibayama et al. | 475/159 |
| 2009/0186737 A1 | | 7/2009 | Matsumoto et al. | |
| 2012/0172167 A1 | * | 7/2012 | Myers et al. | 475/160 |

FOREIGN PATENT DOCUMENTS

| | | |
|---|---|---|
| DE | 102010003467 | 1/2011 |
| JP | 55163364 | 12/1980 |
| JP | 2001159460 | 6/2001 |

* cited by examiner

*Primary Examiner* — Keith Frisby
(74) *Attorney, Agent, or Firm* — Jeff A. Greene

(57) ABSTRACT

A drive axle assembly is provided that improves lubrication to the components of the drive axle assembly. As the wheel differential rotates, lubricant is splashed and lubricates bearings and other associated components of the differential assembly. In addition, lubricant is pumped by rotation of the first and second spur gears and is fed to the radial face of a forward bearing through a lubrication passage through a plurality of passages.

20 Claims, 4 Drawing Sheets

LUBRICATION ARRANGEMENT FOR A DRIVE AXLE OF A HAUL VEHICLE

TECHNICAL FIELD

The present invention relates to a center axle assembly for an articulated haul vehicle and more particularly to a lubricating arrangement for a support bearing of a drive shaft for the center axle assembly.

BACKGROUND

Haul trucks, both on and off highway, include three axles a forward axle, a center axle and a rear axle. Output from a power source is supplied to all three axles via drive shafts. A transmission is directionally engaged to power the axle assemblies. While the forward axle assembly may be operatively engaged/disengaged through the use of a drop box to allow the truck to be operated in an all-wheel drive mode. Each axle assembly includes a differential gear set that includes a pinion gear in mesh with a ring gear. The pinion gears of the forward and rear axle assemblies are generally directly driven via drive shafts through splined connections via a yoke. While the center axle includes a through shaft that drives a series of gears to drive the pinion gear and lastly the differential wheel.

The through shaft is supported at each end by a pair of bearings. One pair of bearings support a forward end of the through shaft and an additional pair of bearings support a rear end of the through shaft.

There is a need to provide lubrication to components of the center axle assembly and particularly the support bearings for the through shaft. Conventional methods of lubricating the bearings include the use of splash lubrication from the pinion gear and bevel gear during operation of the haul truck. However, due to location of each bearing splash lubrication from the pinion gear and the bevel gear rotation cannot reach all of the bearings at the front end of the center axle assembly. A known method for lubricating components of the center axle assembly is shown in U.S. Pat. No. 7,258,641 issued to Green et al on Aug. 21, 2007 and assigned to Dana Corporation. In the "641" patent, lubricant splashed from the ring gear is collected and is then distributed by a bearing supporting the output side gear for rotation within the housing for the assembly. The bearing directs lubricant to the differential gears where seals and/or close tolerances retain the lubricant and allow it to flow to the surfaces of the input shaft and the helical side gear disposed about the input shaft. The output side gear disposed about the output shaft may also include a passage allowing lubricant to flow through the gear to the bearing surfaces of the output shaft and output side gear. Not all center axle assemblies have the differential gears and close tolerances are costly to manufacture.

The present disclosure is directed to overcoming one or more of the deficiencies as set forth above.

SUMMARY OF THE INVENTION

In one aspect of the present disclosure a drive axle assembly includes a housing and an input shaft extending into the housing and disposed about an axis of rotation. A first spur gear is disposed about the input shaft and the axis of rotation, the first spur gear is configured to provide power to a first wheel differential and includes a ring gear. A second spur gear is disposed about a pinion shaft. The pinion shaft is configured to provide power to the first wheel differential via a pinion gear. The second spur gear is drivingly coupled to the first spur gear. A forward bearing is positioned forward and adjacent the first spur gear, the bearing is disposed about the input shaft and supports the input shaft for rotation within the housing. A rearward bearing is positioned rearward and adjacent the first spur gear, the bearing is disposed about the input shaft and supports the input shaft for rotation within the housing. The first and second spur gears pump a lubricant from the housing to a lubrication passage and supply the lubricant to a radial face of at least one of the forward and rearward bearings.

In another aspect of the present disclosure a drive axle assembly includes a housing and an input shaft extending into the housing and disposed about an axis of rotation. A through shaft is connected to the input shaft at a first end and being supported by a pair of bearings at a second end. A first spur gear is disposed about the input shaft and the axis of rotation, the first spur gear is configured to provide power to a first wheel differential, the first wheel differential includes a ring gear. A second spur gear is disposed about a pinion shaft, the pinion shaft is configured to provide power to the first wheel differential via a pinion gear, and the second spur gear is drivingly coupled to the first spur gear. A bearing is positioned adjacent the first spur gear and disposed about the input shaft and supports the input shaft for rotation within the housing. The first and second spur gears pump lubricant from the housing to the lubricant passage and to at least one of the forward and rearward bearings supporting the input shaft.

In yet another aspect of the present disclosure a haul vehicle includes a frame assembly having at least a front portion and a rear portion, an articulation joint connects the front and rear portions and is adapted to allow pivotal movement about the joint by the front and rear portions. A front, center and rear axles supports the frame assembly and includes a plurality of ground engaging devices attached to the axles. An operator compartment is also supported by the frame assembly. A bed adapted to carry a load is also connected to the frame assembly. An engine that generates torque is supported by the frame assembly. A transmission is coupled to the engine for receiving the torque, the transmission having an output coupling for providing the torque to the front, center and rear axles. The center axle includes a drive axle assembly.

DETAILED DESCRIPTION

Figure 1:
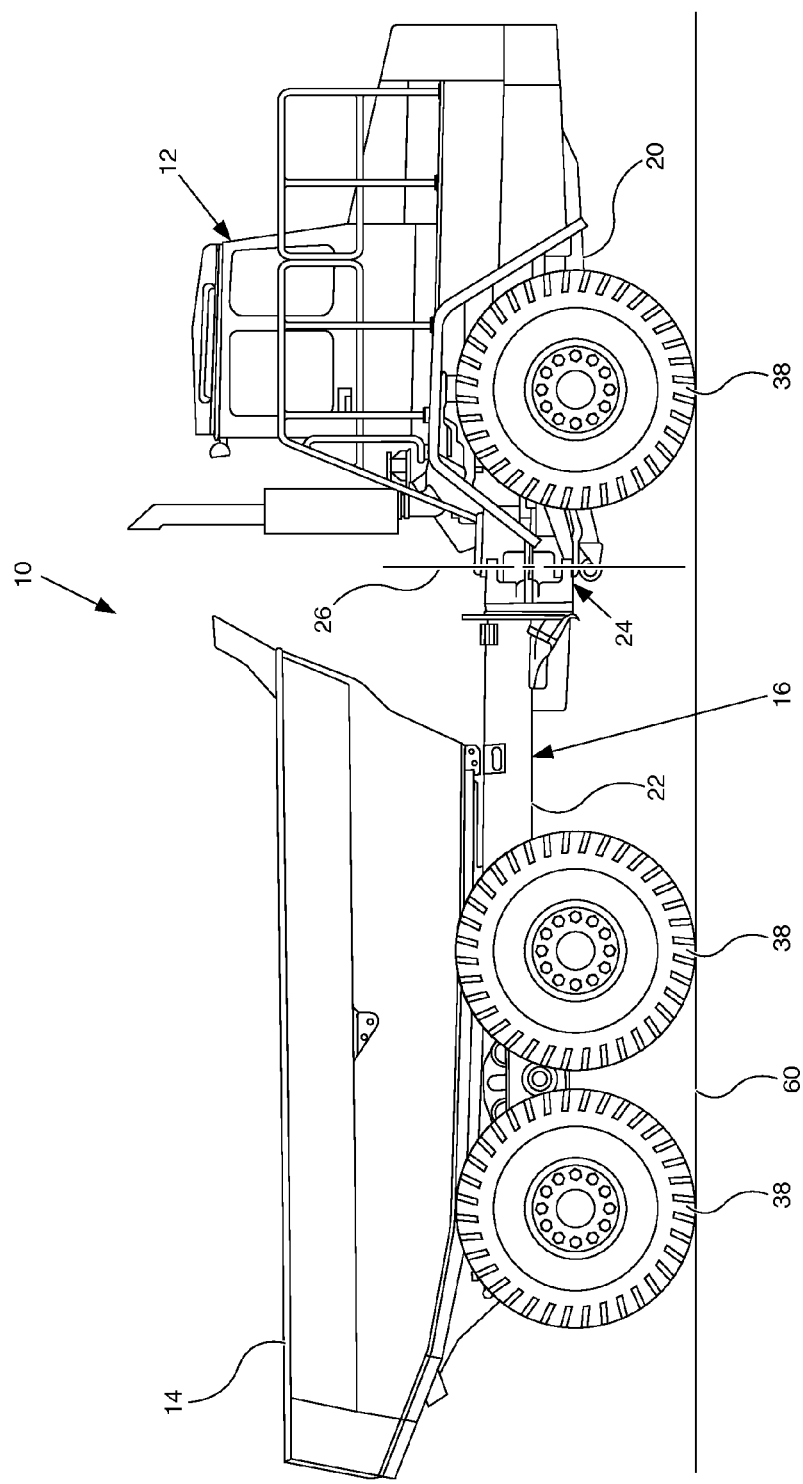
FIG. 1 is a side view of an articulated truck of the present description.
Figure 2:
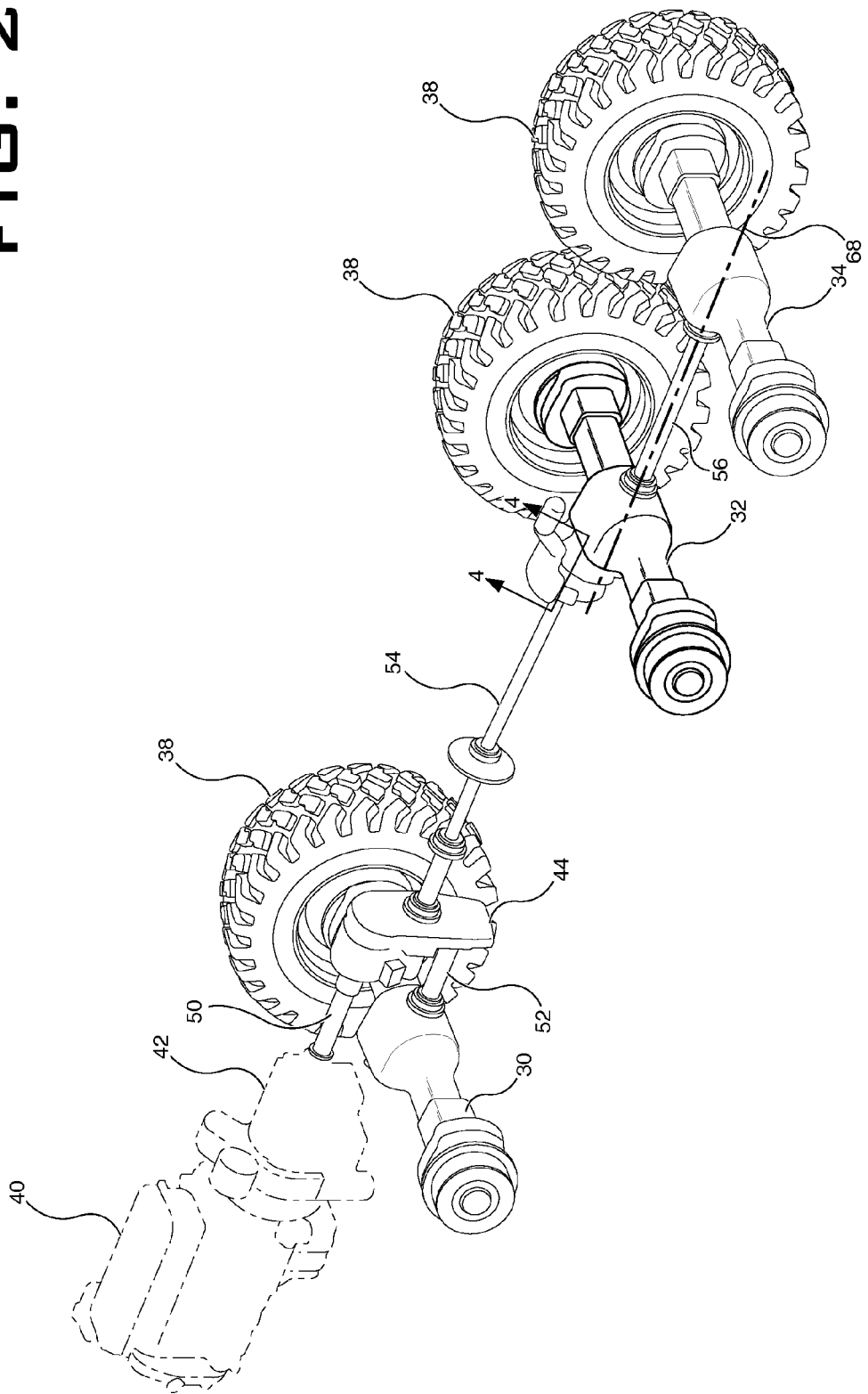
FIG. 2 is a pictogram of a drive train of an articulated truck shown in FIG. 1.

Referring now to FIGS. 1 and 2, a haul vehicle 10 is shown as being, for example, an articulated truck for carrying loads through a plurality of work cycles. The haul vehicle 10 includes an operator station or cab 12, a bed 14 and a main frame 16. Main frame 16 includes a front portion 20, a rear portion 22 and an articulation joint 24 for steering the haul vehicle 10. The articulation joint 24 connects the front and rear portions 20, 22 and allows for pivotal movement about the articulation joint 24 of the front and rear portions 20,22 through an axis 26 so that the haul vehicle 10 can be steered via hydraulic cylinders (not shown). Front portion 20 of main frame 16 is supported by a front axle 30 (FIG. 2), and rear portion 22 of main frame 16 is supported by a center axle 32 and a rear axle 34. A plurality of ground engaging devices 38 are supported on the front axle 30, center axle 32 and rear axle 34.

Power is provided to the front axle 30, center axle 32 and rear axle 34 by an engine 40 (FIG. 2), a transmission 42 (FIG. 2), and a transfer box 44 for receiving the torque and transferring the torque to a plurality of drive shafts 50, 52, 54, 56 (FIG. 2). The plurality of ground engaging devices 38 (one each) are attached to each end of the front axle, center axle and rear axle 30, 32, 34 and are preferably used for traversing a grade 60.

Power from the engine 40 is transferred to the transmission 42 by direct connection. The transmission 42 includes a plurality of gears (not shown) that may be engaged in various combinations to achieve desired gear ratios for powering the haul vehicle 10 at various speeds and output torques. In addition, the gears control the direction of rotation of the output of the transmission 42 to establish forward and reverse movement of the haul vehicle 10. Output from the transmission 42 is sent to transfer box 44 by drive shaft 50. Transfer box 44 divides the rotational input into two directions and provides output to drive shafts 52 and 54. The output to drive shaft 52 may be selectively activated to enable the haul vehicle 10 to operate in an all-wheel drive mode. Drive shaft 54 connects to the input of center axle 32 and drive shaft 56 is connected to rear axle 34.

Figure 3:
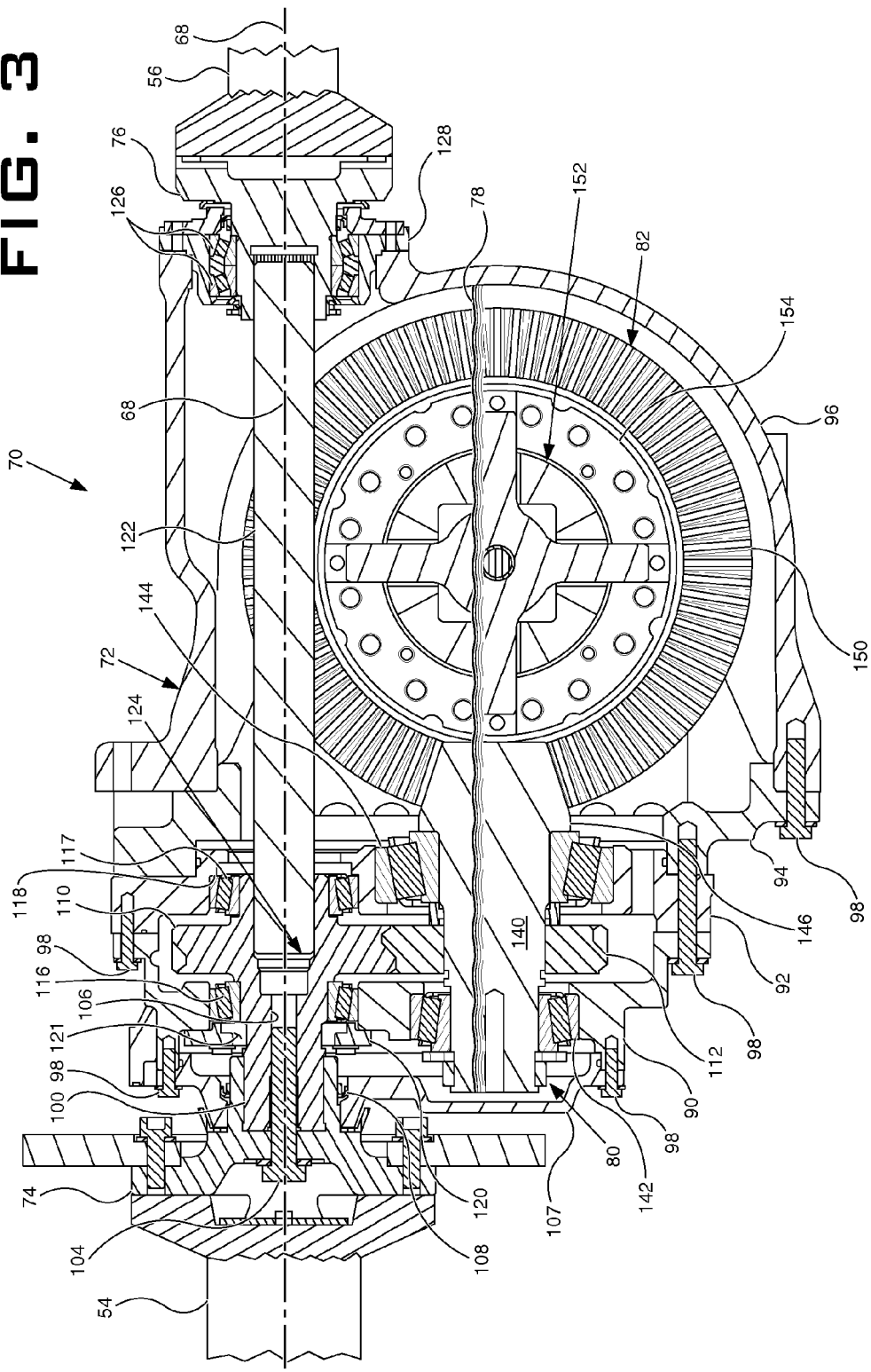
FIG. 3 is a cutaway view of a center axle assembly of the drivetrain shown in FIG. 2.

FIG. 3 illustrates a cross sectional view of a drive axle assembly 70 of the center axle 22 taken vertically along axis of rotation 68. As stated prior center axle 32 receives input from drive shaft 54 and is connected to the rear axle 34 through drive shaft 56. Center axle 22 is provided to drive two of the plurality of ground engaging devices 38 supported on either side of center axle 32 on axle half shafts (not shown) extending from center axle 32. Center axle 32 is particularly adapted for use in haul vehicle 10. It should be understood, however, that the present invention is not limited to use in haul vehicle 10 and may be used in a wide variety of tandem axle vehicles. Drive axle assembly 70 may include a housing 72, an input yoke 74, an output yoke 76, a pinion shaft assembly 80 and a wheel differential 82.

Housing 72 provides structural support for the other components of drive axle assembly 70. Housing 72 also protects the other components of drive axle assembly 70 from foreign objects, the elements and contains a level of lubricant 78. Housing 72 may be made from conventional metals and/or metal alloys such as steel and may include multiple cover members 90, 92, 94, and 96 that are sized relative to components of drive axle assembly 70 and coupled together using conventional fasteners 98.

An input shaft 100 transmits power from the drive shaft 54 to drive axle assembly 70. Shaft 100 may be made from conventional metals and/or metal alloys. Shaft 100 is driven by the drive shaft 54 through input yoke 74. The input yoke 74 may be splined to the forward end of input shaft 100 and may be retained thereon by a fastener 104 and a washer which are disposed into a threaded aperture 106 that extends into the forward end of shaft 100. A cover 107 is disposed about input yoke 100. Input yoke 100 is received within an opening in cover member 107. Input yoke 100 is sealed for rotation about the axis of rotation 68 within an opening in cover 107 by a seal 108 disposed within the opening.

Input shaft 100 includes a first spur gear 110 that transfers torque to a second spur gear 112 to pinion shaft assembly 80. First and second spur gears 110, 112 may be for example helical spur gears or any other conventional gear in the art and may be made from conventional metals and/or metal alloys. Spur gear 110 is disposed about input shaft 100 and is rotatable therewith.

Input shaft 100 is rotatable through the support of a forward and a rearward bearing 116, 117 positioned on each side of first spur gear 110. One side of the rearward bearing 117 may contact a shoulder 118 positioned in cover 92 and the other side is shouldered against the rearward portion of the first spur gear 110. The forward bearing 116 shoulders against the forward side of the first spur gear 110. A cover 120, held in place by fasteners, contacts the forward bearing 116 providing preload and retaining forward and rearward bearings 116, 117 the first spur gear 110 and the input shaft 100 and preventing axial movement thereof. The cover 120 also forms a radial cavity 121 in front of the forward bearing 116.

Input shaft 100 may be splined to a through shaft 122. Through shaft 122 is provided to transmit a portion of the power provided by input shaft 100 and the through shaft 122 to the rear drive axle assembly 34 (shown in FIG. 2) through drive shaft 56. Shaft 122 is conventional in the art, and is coaxially disposed relative to input shaft 100 along axis 68 and includes a pilot portion 124 at its forward end on which input shaft 100 is journaled. Shaft 122 extends through openings in housing members 92 and 94 respectively, and is journaled within by a pair of bearings positioned in a bearing cage 128 housed in an opening of housing member 96.

Pinion shaft assembly 80 transfers power from first spur gear 110 to wheel differential 82. Pinion shaft assembly 80 may include second spur gear 112 helical driven to transfer torque to a pinion shaft 140. Gear 112 may be drivingly coupled to shaft 140 through axially extending splines (not shown) on shaft 140. Shaft 140 may be rotationally supported by bearings 142, 144 within bearing cages in covers 90 and 92. Pinion shaft 140 includes a pinion gear 146 at a rearward end.

Wheel differential 82 is provided to allow the ground engaging members 38 supported on either side of center axle assembly 32 to rotate at different speeds. Assembly 82 includes a ring gear 150, and a conventional bevel gear set 152 disposed within a differential carrier 154. Ring gear 150 transfers torque from pinion gear 146 to gear set 152 and is conventional in the art. Ring gear 150 may be made from conventional metals and/or metal alloys and may comprise a hypoid gear. Gear 150 is affixed to carrier 154 or may be integral therewith. Gear set 152 is provided to transfer torque from ring gear 84 to the axle half shafts (not shown) supporting the ground engaging members in a conventional manner.

Figure 4:
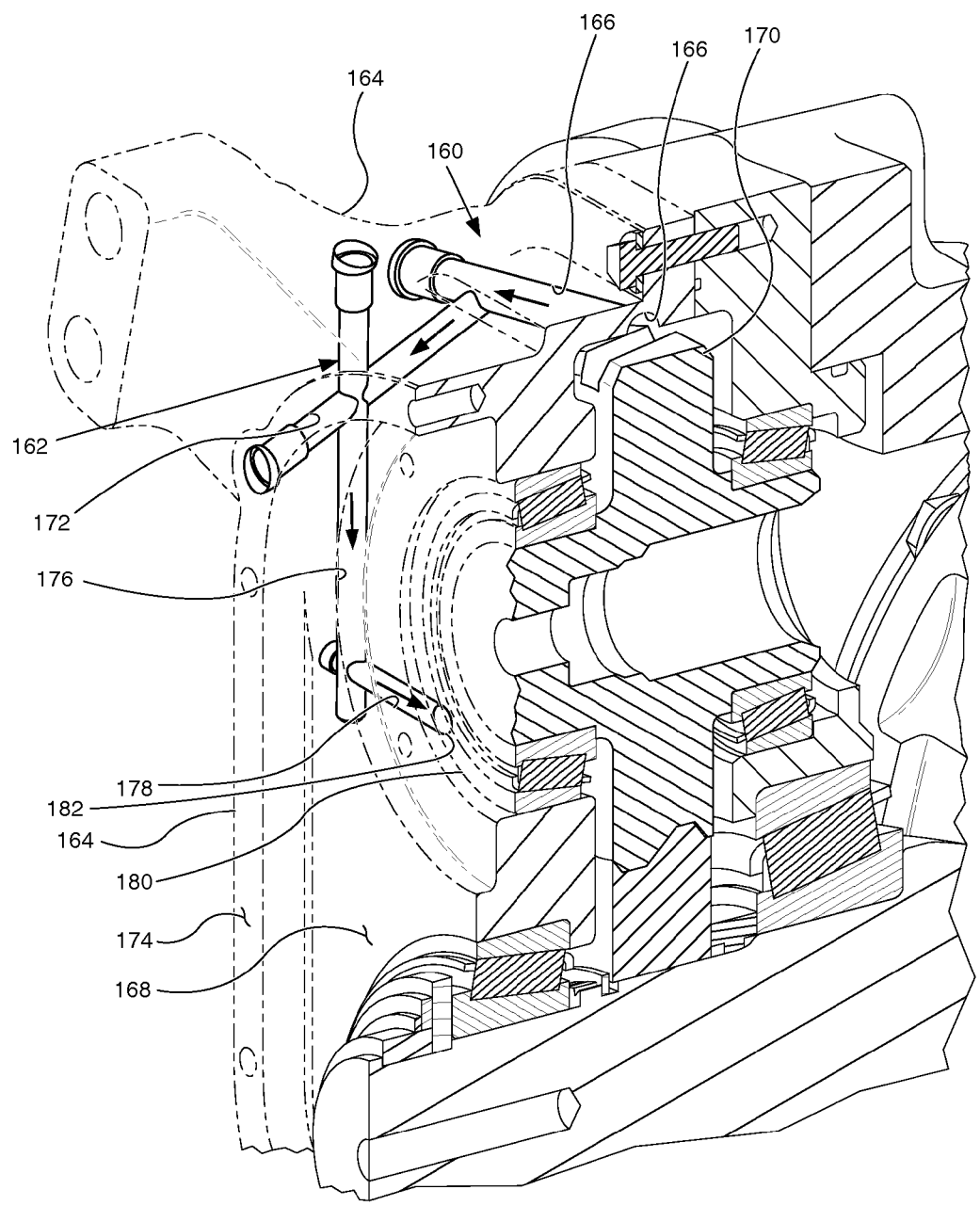
FIG. 4 is a partial cutaway view of a portion of the center axle assembly taken along section lines shown in FIG. 2.

Referring now to FIG. 4, a cut away portion, taken along a portion of section line 4-4 in FIG. 2 and isolated from some of the components in FIG. 3, of the drive axle assembly 70 showing the housing 72 will be described in greater detail. A lubrication passage 160 is formed in cover member 90 of housing 72. Specifically, lubrication passage 160 is formed by a plurality of passages 162 that extend from an outside surface 164 of cover 90. A first passage 166 may be formed into cover member 90 in an upward manner so that it exits on an interior 168 of housing 72 tangential to an outer surface 170 of the first spur gear 110. A second passage 172 is formed from a mounting surface 174 of cover member 90 at an inclined manner intersecting perpendicular to first passage 166. A generally vertical passage 176 is formed from the exterior 164 at a predetermined depth and intersects the second passage 172. Lastly a generally horizontal passage 178 is formed from the outside surface 164 of housing 72 and exits on the interior 168 of cover 90. The generally horizontal passage 178 forms a lubrication outlet 182 adjacent a radial face 180 of the forward bearing 116. The plurality of passages are each shown as being blocked from the exterior 164 in a conventional manner as by threaded or force fit plugs (not shown) so that contaminants are not allowed to enter the interior 168 of housing 72. However, it should be understood that cast holes would work as well. While the specific description of the drive axle assembly 70 has focused on the center axle 32, it should be understood that a front or a rear axle 30, 34 that drives the pinion assembly 80 via first and second spur gears 110, 112 and does not include a through shaft 122 will be equally applicable.

INDUSTRIAL APPLICABILITY

Referring now to FIGS. 3 and 4, the lubrication system for the drive axle assembly 70 of the center axle will be described in greater detail. During operation of the haul vehicle 10, rotational input power is provided to drive axle assembly 70 via drive shaft 54. As the wheel differential 82 is rotated lubricant is splashed and lubricates bearings 126, 142, 144 and the rear bearing 117 and other associated components of the drive axle assembly 70. In addition, lubricant 78 is pumped by second spur gear 112 to first spur gear 110. The lubricant 78 pumped by first and second spur gears 110, 112 is feed to the radial face 180 of forward bearing 116 through the lubrication passage 160 through the plurality of passages 162 following the directional arrows shown in FIG. 4. Specifically, lubricant 78 is expelled from the first spur gear 110 in a tangential manner into first passage 166. From the first passage 166 lubricant 78 flows downward, via the pumping action from the first and second spur gears 110, 112 and gravity, to the second passage 172. Lubricant 78 finishes by flowing through the generally vertical and horizontal passages 172, 178 to the interior 168 of the housing 72 into the radial cavity 121 between the forward surface 180 of the forward bearing 116 and the cover 120.

It should be recognized that through the design of the drive axle assembly 70, by controlling various aspects such as dimension and ratios, more or less lubrication can be provided to the forward bearing 116. For example by controlling the dimensions of the plurality of passages 162, the viscosity of the lubricant 78 and clearances between the first spur gear 110 and the cover member 90 the amount of lubricant 78 feed to the forward and rearward bearings 116,117 may be controlled. In this manner, the drive axle assembly 70 provides increased lubrication to components that are above the lubricant 78 level in the housing 72 and farthest away from any splash lubrication that is provided by the differential wheel 82 rotation.

While the invention has been particularly shown and described with reference to the preferred embodiments thereof, it is well understood by those skilled in the art that various changes and modifications can be made in the invention without departing from the spirit and scope of the invention.

What is claimed is:

1. A drive axle assembly, comprising:
   a housing;
   an input shaft extending into the housing and disposed about an axis of rotation;
   a first spur gear disposed about the input shaft and the axis of rotation, the first spur gear configured to provide power to a first wheel differential, the first wheel differential including a ring gear;
   a second spur gear disposed about a pinion shaft, the pinion shaft configured to provide power to the first wheel differential via a pinion gear, the second spur gear drivingly coupled to the first spur gear;
   a forward bearing positioned forward and adjacent the first spur gear, the bearing disposed about the input shaft and supporting the input shaft for rotation within the housing; and
   a rearward bearing positioned rearward and adjacent the first spur gear, the bearing disposed about the input shaft and supporting the input shaft for rotation within the housing, wherein the first and second spur gears pump a lubricant from the housing to a lubrication passage and supply the lubricant to a radial face of at least one of the forward and the rearward bearing.

2. The drive axle assembly of claim 1 wherein the lubrication passage includes a plurality of passages for delivering lubricant to the bearing positioned forward and adjacent the first spur gear.

3. The drive axle assembly of claim 2 wherein the plurality of lubrication passages includes a first passage being positioned tangential to an outer surface of the first spur gear.

4. The drive axle assembly of claim 3 wherein the lubricant pumped from the outer surface of the first spur gear enters the first passage and flows from the first passage to the radial face of the forward bearing.

5. The drive axle assembly of claim 4 wherein a plurality of passages are formed from an exterior surface of a cover member towards the interior.

6. The drive axle assembly of claim 5, wherein the plurality of passages are plugged from the exterior of the housing.

7. The drive axle assembly of claim 6, further including:
   a cover member positioning the forward bearing against the first spur gear.

8. The drive axle assembly of claim 7, wherein the cover member forms a radial cavity on an interior of the housing between the cover member and the radial face of the forward bearing.

9. A drive axle assembly, comprising;
   a housing;
   an input shaft extending into the housing and disposed about an axis of rotation;
   a through shaft connected to the input shaft at a first end and being supported by a pair of bearings at a second end;
   a first spur gear disposed about the input shaft and the axis of rotation, the first spur gear configured to provide power to a first wheel differential, the first wheel differential including a ring gear;
   a second spur gear disposed about a pinion shaft, the pinion shaft configured to provide power to the first wheel differential via a pinion gear, the second spur gear drivingly coupled to the first spur gear;
   a forward bearing positioned forward and adjacent the first spur gear, the bearing disposed about the input shaft and supporting the input shaft for rotation within the housing; and
   a rearward bearing positioned rearward and adjacent the first spur gear, the bearing disposed about the input shaft and supporting the input shaft for rotation within the housing, wherein the first and second spur gears pump lubricant from the housing to a lubricant passage and to at least one of the forward and the rearward bearings supporting the input shaft.

10. The drive axle assembly of claim 9 wherein the first spur gear is integral with the input shaft.

11. The drive axle assembly of claim 10 wherein the lubrication passage includes a plurality of passages for delivering lubricant to the bearing positioned forward and adjacent the first spur gear.

12. The drive axle assembly of claim 11 wherein the plurality of lubrication passages includes a first passage being positioned tangential to an outer surface of the first spur gear.

13. The drive axle assembly of claim 12 wherein the lubricant pumped from the outer surface of the first spur gear enters the first passage and flows from the first passage to the radial face of the forward bearing.

14. The drive axle assembly of claim 13 wherein a plurality of passages are formed from an exterior surface of a cover member towards the interior.

15. The drive axle assembly of claim 14, wherein the plurality of passages are plugged from the exterior of the housing.

16. The drive axle assembly of claim 15, further including:
a cover member positioning the forward bearing against the first spur gear.

17. The drive axle assembly of claim 16, wherein the cover member forms a radial cavity on an interior of the housing between the cover member and the radial face of the forward bearing.

18. A haul vehicle, comprising:
a frame assembly having at least a front portion and a rear portion;
an articulation joint connecting the front and rear portions and adapted to allow pivotal movement about the joint by the front and rear portions;
a front, center and rear axle supporting the frame assembly;
a plurality of ground engaging devices attached to the axles;
an operator compartment supported by the frame assembly;
a bed adapted to carry a load and being connected to the frame assembly;
an engine for generating torque and being supported by the frame assembly;
a transmission coupled to the engine for receiving the torque, the transmission having an output coupling for providing the torque to the front center and rear axles; and
the center axle assembly including a drive axle assembly as set forth in claim 17.

19. The haul vehicle of claim 18 wherein the front axle supports the front portion of the frame assembly and the center and rear axles support the rear portion of the frame assembly.

20. The haul vehicle of claim 19 including a transfer box positioned between the transmission and the front axle and between the transmission and the center and rear axles.

* * * * *